United States Patent [19]

Garvey et al.

[11] Patent Number: 5,436,538
[45] Date of Patent: Jul. 25, 1995

[54] LOCOMOTIVE WHEEL SLIP CONTROLLER

[75] Inventors: Daniel C. Garvey; James R. Bowers, both of Fort Collins; Bruce G. Bailey, Larimer, all of Colo.

[73] Assignee: Woodward Governor Company, Rockford, Ill.

[21] Appl. No.: 266,422

[22] Filed: Jul. 5, 1994

[51] Int. Cl.6 .............................................. B61C 15/08
[52] U.S. Cl. ...................................... 318/52; 180/197
[58] Field of Search ...................... 318/52, 34, 45–47, 318/49, 51, 85, 86, 98, 139, 609–610; 180/197; 364/160–163

[56] References Cited

U.S. PATENT DOCUMENTS

| | | | |
|---|---|---|---|
| 4,335,337 | 7/1979 | Okamatsu et al. | 318/52 |
| 4,463,289 | 9/1982 | Young | 318/52 |
| 4,498,016 | 2/1985 | Earlson et al. | 290/40 R |
| 4,588,932 | 5/1986 | Riondel | 318/52 |
| 4,701,682 | 1/1986 | Hirotsu et al. | 318/52 |
| 4,896,090 | 10/1988 | Balch et al. | 318/52 |
| 4,924,395 | 5/1990 | Evans et al. | 318/52 X |
| 4,944,539 | 7/1990 | Kumar et al. | 291/2 |
| 4,950,964 | 8/1990 | Evans | 318/52 |
| 5,041,772 | 8/1991 | Earlson et al. | |
| 5,130,929 | 7/1992 | Shiraishi et al. | 180/197 |
| 5,172,319 | 12/1992 | Shiraishi et al. | 180/197 |

OTHER PUBLICATIONS

An article by B. R. Meyer and A. P. de Buhr, entitled "Super Series Wheel Creep Control System", and printed on pp. 1 through 9 of a publication by The American Society of Mechanical Engineers. The article was contributed by the Rail Transportation Division of the American Society of Mechanical Engineers for presentation at the Winter Annual Meeting, Nov. 16–21, 1980, Chicago, Ill. Manuscript received at ASME Headquarters, Jun. 23, 1980.

An article by W. M. Scott, R. B. Skene, and B. A. Biglow, entitled "Locomotive Traction Performance Measurement", and printed on pp. 1 through 10 of a publication by The American Society of Mechanical Engineers. The article was contributed by the Rail Transportation Division of The American Society of Mechanical Engineers for presentation at the IEEE-ASME Joint Conference, San Francisco, Calif., Apr. 15–17, 1975. Manuscript received at ASME Headquarters, Jan. 6, 1975.

Primary Examiner—David S. Martin
Attorney, Agent, or Firm—Leydig, Voit & Mayer, Ltd.

[57] ABSTRACT

A wheel slip controller for a locomotive is disclosed that utilizes PID controllers to control the traction wheels during normal locomotive operation. The controller monitors several independent wheel slip indicators to provide rapid detection of excessive wheel slip. Upon detecting excessive traction wheel slip, motor control from the operative PID controller is suspended and a wheel slip compensator assumes command of the traction wheel drive motors. The wheel slip compensator then dynamically compensates the motors depending upon the amount of wheel slip that is detected. Once the wheel slip condition has been corrected, control of the traction motors is transferred back to the interrupted PID controller.

24 Claims, 6 Drawing Sheets

LOCOMOTIVE WHEEL SLIP CONTROLLER

BACKGROUND OF THE INVENTION

1. Field of the Invention

The present invention relates generally to locomotive propulsion, and more particularly, to the control of wheel slip and wheel slide in locomotive traction wheels during acceleration and braking.

2. Description of the Prior Art

A typical rail locomotive has four or six drive axles. Each drive axle extends between a pair of traction wheels that are disposed for rotational engagement with the track rails. A motor is coupled with each drive axle through a gearing assembly in such a fashion that rotation of the motor armature rotates the drive axle in a predetermined ratio, which in turn rotates the traction wheels mounted on its ends. Accordingly, propulsion of the locomotive is achieved by exciting the motors adapted to rotate the drive axles and traction wheels.

It has long been known that the metal-metal surface contact between the traction wheels and the track rail fosters a variable frictional engagement. As a result, wheel slip has long been known to be a factor in locomotive speed control, and excessive wheel slip has been known to be a problem, particularly during times of acceleration, braking, and changing wheel-rail surface conditions. Among the deleterious effects of excessive or uncontrolled wheel slip are the reduction in acceleration and braking efficiency, reduced tractive effort or adhesion, and excessive component wear and tear leading to premature fatigue and failure of various component parts.

As a preliminary matter of clarification, the term wheel slip, as it will often be used in this specification unless otherwise indicated, refers to either positive wheel slip as incurred during times of normal motoring operation or negative wheel slip, or wheel slide, as incurred during times of braking. It will be appreciated that the corrective actions taught by the present invention can be applied to control systems to compensate for positive wheel slip, negative wheel slip, or both. During positive wheel slip power to the drive motors will be reduced, whereas during negative wheel slip braking power will be reduced.

In addition to times of acceleration and braking, wheel slip is often problematic when the locomotive is traveling at a constant velocity. For example, when track conditions suddenly change and the locomotive travels from a dry track section to a wet or oily track section, wheel slip can occur. Since track conditions can change virtually instantaneously, it is important for the wheel slip corrective system to be able to quickly detect and immediately act upon a slip condition.

Early wheel slip corrective systems approached the problem by detecting wheel slip and eliminating it entirely. It was later determined that a small amount of wheel slip was desirable. More specifically, it was discovered that increased locomotive tractive effort and, therefore, enhanced locomotive performance was achieved at slip levels as high as ten to twenty percent, depending upon the track conditions. Therefore, later wheel slip corrective systems sought to enhance locomotive performance by maintaining a small percentage of wheel slip. Indeed, a number of presently employed wheel slip corrective systems operate in this fashion, ignoring small amounts of wheel slip and taking corrective action only after a certain threshold of slip has been exceeded. Other, more sophisticated systems, operate to maintain a variable amount of wheel slip, in an attempt to maintain maximum traction throughout changing track conditions.

While these and similar corrective systems enhance locomotive performance, further improvements are desired. Improvements, for example, that will further reduce the time required for wheel slip correction, while, at the same time, further improving locomotive performance. It should be appreciated, however, that competing interests (fast wheel slip correction and maintaining high locomotive performance) are present in a wheel slip correction sequence. On one hand, since excessive wheel slip acts to degrade locomotive performance, locomotive performance is enhanced by quickly eliminating excessive wheel slip. On the other hand, however, inertial effects degrade locomotive performance when sharp power reductions are applied to the traction motors.

To better illustrate this latter point, suppose a locomotive is accelerating from rest and the drive motors are operating at a particular power level when excessive wheel slip is detected. Wheel slip can be quickly reduced or eliminated by abruptly reducing power to the drive motors. However, such a sharp power reduction will result in an undue delay in the locomotive acceleration (and rough train handling), and thus degrade locomotive performance. Furthermore, power must be re-applied in a controlled manner in order to avoid applying excessive strain on various coupler components.

Accordingly, it is desired to maximize locomotive performance by rapidly reducing excessive wheel slip, while minimizing the power reductions applied to the motors. This is more commonly referred to as minimizing the power "deration" (i.e., amount and duration of corrective action).

SUMMARY OF THE INVENTION

Accordingly, a primary object of the present invention is to provide a locomotive wheel slip control system capable of achieving greater adhesion than presently existing systems.

Another object of the present invention is to provide a locomotive wheel slip control system having improved response times over presently existing systems.

Another object of the present invention is to provide a locomotive wheel slip control system capable of rapidly detecting wheel slip conditions under a variety of conditions, including multiple, simultaneous wheel slip.

Still another object of the present invention is to provide a locomotive wheel slip control system capable of rapidly correcting excessive wheel slip conditions while avoiding undue degradation in locomotive performance caused by excessive derating.

Yet another object of the present invention is to provide a locomotive wheel slip control system that maximizes locomotive performance by reliably maintaining an operating point near the optimum level of wheel slip.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, the present invention is generally directed to a locomotive wheel slip controller. In a locomotive of the type having a plurality of traction motors, each traction motor is disposed to rotate a pair of traction wheels for propelling the locomotive. The wheel slip controller operates by controllably varying the input signal to a variable power supply, where the output of the power supply is electrically connected to power the traction motors. At least one proportional-integral-derivative (PID) controller is utilized to control the input signal to the variable power supply during normal locomotive operation. A wheel slip detector is provided for detecting excessive wheel slip. That is, wheel slip that exceeds a predetermined threshold value. Responsive to the operation of the wheel slip detector, is a slip compensator which includes at least one slip correction control loop. The slip compensator is adapted to rapidly reduce excessive wheel slip by interrupting the output of the operative PID controller and assuming direct control of the variable power supply, upon detection of excessive wheel slip by the wheel slip detector. Finally, once the excessive wheel slip condition has been corrected, the slip compensator transfers control of the variable power supply back to the PID controller, which resumes operation at substantially the same point of operation as when interrupted.

As previously mentioned, maximum locomotive traction is attained when a small amount of slip occurs. It can be appreciated from the foregoing discussion that optimum locomotive performance is achieved when the locomotive is operating at the point of maximum traction. Therefore, the slip threshold of the present invention is established at this value of slip. As the level of wheel slip exceeds this threshold, locomotive traction performance is degraded. Accordingly, the sooner slip conditions are detected and acted upon, better locomotive performance will be realized. To help achieve this desired level of performance, the present invention provides a wheel slip detector for rapidly detecting excessive wheel slip conditions.

In a preferred embodiment, the present invention senses a plurality of conditions to help achieve rapid wheel slip detection. The rotational speed and acceleration of each traction wheel are examples of two such conditions. In addition, the drive current of each traction motor is monitored.

The occurrence of any one out of several different events is an indication of wheel slip. First, if any wheel is accelerating at a rate exceeding a predetermined maximum rate, it is a sign of wheel slip. A second sign of wheel slip is an impermissible differential between the rotational speeds among the various traction wheels. A related index of wheel slip is an impermissible differential between the rotational speed of the fastest traction wheel and the estimated ground speed of the locomotive. Traction motor drive current is yet another index of wheel slip. Specifically, traction motor current will decrease upon wheel slip.

A preferred embodiment of the present invention monitors each of the above-described indicia, and signals detection of excessive wheel slip when certain threshold conditions are exceeded. It should be appreciated that under various circumstances, any one of the above conditions might occur first. Accordingly, by continuously monitoring each of these conditions, the present invention provides extremely fast wheel slip detection.

Once an excessive slip condition has been detected, the present invention suspends the operation of the operative PID controller and assumes direct control of driving the traction motors. The slip compensator then dynamically controls the traction motors based upon various slip indicators. As previously described, these indicators include wheel acceleration, the differential in traction motor current, as well as differential in various traction wheel speeds. In this way, the slip compensator seeks to correct wheel slip with minimal deration (i.e., amount and duration of compensation). It should be appreciated that as the slip indicators indicate higher levels of wheel slip, greater levels of compensation are applied to the traction motors (compensation being a reduction in the motor drive signal). Once the excessive wheel slip condition has been corrected (i.e., reduced to an acceptable level) then the present invention transfers control of the traction motors back to the operative PID controller.

DESCRIPTION OF THE DRAWINGS

The accompanying drawings incorporated in and forming a part of the specification, illustrate several aspects of the present invention, and together with the description serves to explain the principles of the invention. In the drawings.

Reference will now be made in detail to various presently preferred embodiments of the invention, an example of which is illustrated in the accompanying drawings. While the invention will be described in connection with these embodiments, there is no intent to limit it to these embodiments. On the contrary, the intent is to cover all alternatives, modifications and equivalents included within the spirit and scope of the invention as defined by the appended claims.

DETAILED DESCRIPTION OF THE PREFERRED EMBODIMENTS

Figure 1:
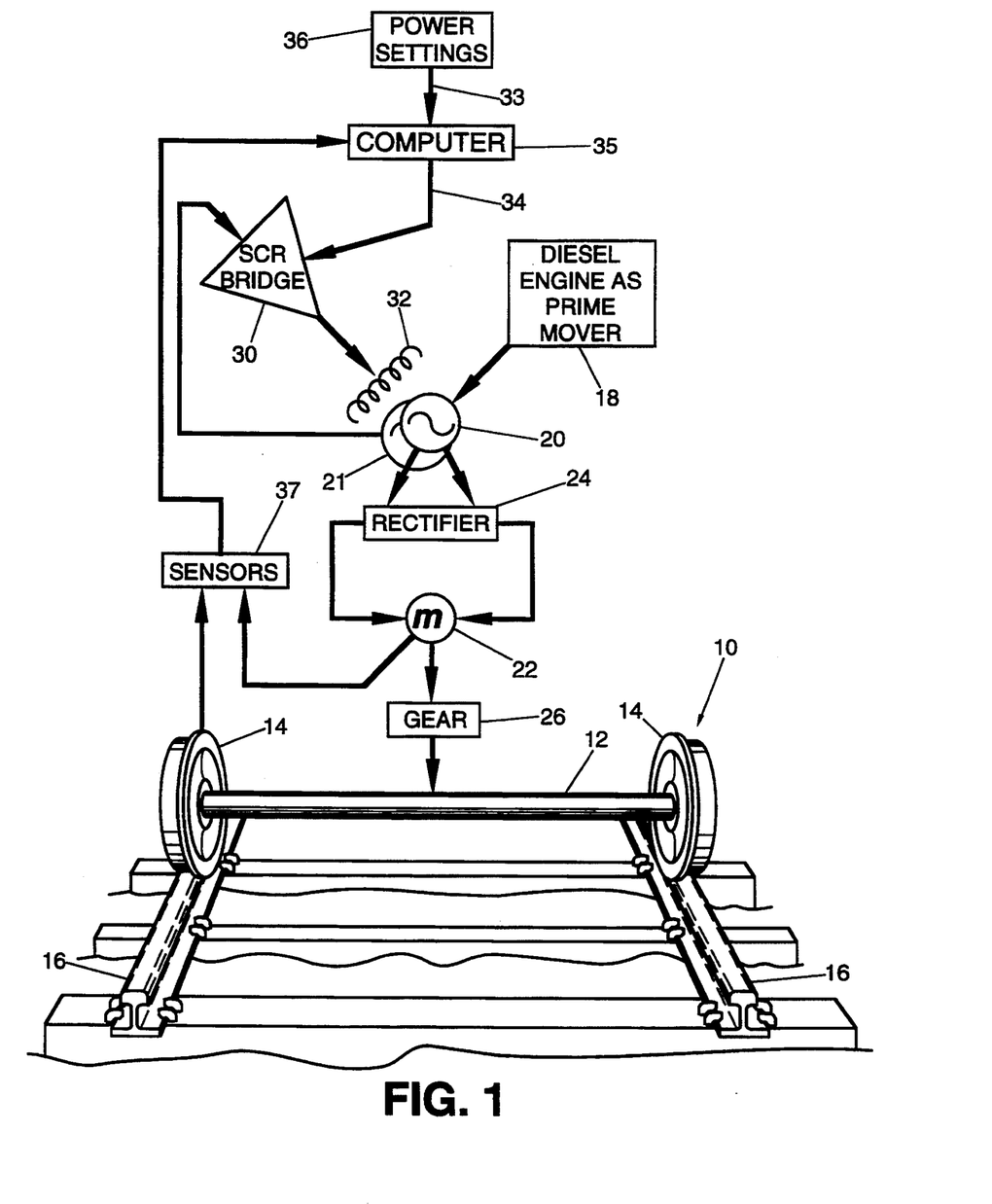
FIG. 1 is a diagram schematically depicting the principal components of a locomotive propulsion system.

Referring now to FIG. 1, a single traction wheel set is shown, generally designated as reference numeral 10 and representative of a plurality (typically four or six) of such wheel sets. The wheel set 10 includes a central axle 12 disposed between and joining two opposedly mounted flanged traction wheels 14. Rotation of the axle 12 imparts an equal rotation to each wheel 14, so as to exert a substantially tangential driving force upon a pair of rails 16, thereby propelling the locomotive along the rails 16.

In diesel-electric locomotives, the driving force for the locomotive is ultimately supplied by a diesel engine, represented in FIG. 1 as block 18. The engine acts as a prime mover, supplying the mechanical motive force to AC generators 20 and 21. As described in more detail below, auxiliary generator 21 is utilized to supply the field excitation for main generator 20 which, coupled with rectifier 24, serves as a controllable, variable power supply for driving a plurality of traction motors 22. Typically, there are either four or six such traction motors in a locomotive, connected in either parallel or series-parallel form, depending upon the locomotive ground speed. Only one motor is shown in the figures, as such is deemed adequate to illustrate the teachings of the present invention.

The motor 22, however, does not directly drive the axle 12. Rather, a gear drive 26 having a known gear ratio couples the motor 22 and the axle 12. Accordingly, a proportionality constant is achieved by the gearing of gear drive 26 so that rotation of the motor 22 armature imparts a different, but proportional, rotation to the axle 12. Specifically, the rotational speed of the motor 22 armature is much greater than the rotational of the axle 12 and traction wheels 14.

A silicon controlled rectifier bridge (hereinafter SCR bridge) 30 is coupled with the auxiliary generator 21 to control the field excitation coil 32 of the main generator 20, so that the output of main generator 20 is variably controlled by the SCR bridge 30. More particularly, a control line 34 is used to turn on, or gate, the SCR bridge 30. When turned on, or gated, the output of the SCR bridge 30 is a full-wave rectified AC signal. When turned off, the SCR bridge 30 inhibits the signal from being applied to the field excitation coil 32 (i.e., zero volts is applied across the field excitation coil 32). During normal operation, the SCR bridge 30 is phase controlled to intermittently apply the rectified AC signal to the field excitation coil 32. Controllably gating the SCR bridge 30 in this manner regulates the average voltage value of the input to the field excitation coil 32, thereby controlling the output of the main generator 20 and, thus, the drive power to the traction motors 22.

The signal on the control line 34 of the SCR bridge 30 is generated and controlled by a central computer 35. It should be appreciated that, although it is not shown in the diagram, an appropriate digital to analog interface exists between the digital computer 35 and the SCR bridge 30, so as to generate the appropriate voltage level on the control line 34. Indeed, it should be appreciated that either digital to analog or analog to digital conversion circuitry is included wherever necessary to transform data to and from the appropriate circuit medium.

Also shown in FIG. 1 are blocks designated as POWER SETTINGS 36 and SENSORS 37. Both of these blocks represent inputs to the computer 35. The POWER SETTINGS block 36 includes the brake and throttle settings, as well as any other locomotive control panel input needed or desired to implement the teachings of the present invention. It is unnecessary, however, to show any greater detail in the figures, as it can be appreciated that one of ordinary skill in the art would understand, for example, that the locomotive throttle typically has eight power positions in addition to an "IDLE" and "SHUTDOWN" position. In order for an operator to initiate locomotive braking, the throttle is shifted into its "IDLE" position and the brake control handle is moved out of its "OFF" position, to various active positions.

The SENSORS block 37 denotes the various sensors used to generate feedback signals utilized by the present invention. For example, one sensor is implemented to sense and feed back voltage across the motor 22. Another sensor is utilized to sense the current driving the motor 22, while yet another sensor is used to detect rotational speed of the traction wheels.

As previously mentioned and will be understood by one of ordinary skill in the art, the concepts of the present invention relate to both the motoring mode of operation as well as the braking mode of locomotive operation. To configure and command the locomotive for braking, the throttle control is initiated as previously described. Once these throttle commands are initiated, the armature windings of the traction motor 22 are switched from their connection with the motor field windings into connection with a load circuit (not shown), which converts the DC motor into a DC generator. Typically, the load circuit comprises an array of fan cooled resistor grids, whereby the electrical power developed by the generators is dissipated in the form of heat. The load provided by the resistor grid is varied depending upon the position of the brake control handle, thereby providing for throttle-controlled, dynamic braking.

Figure 2A:
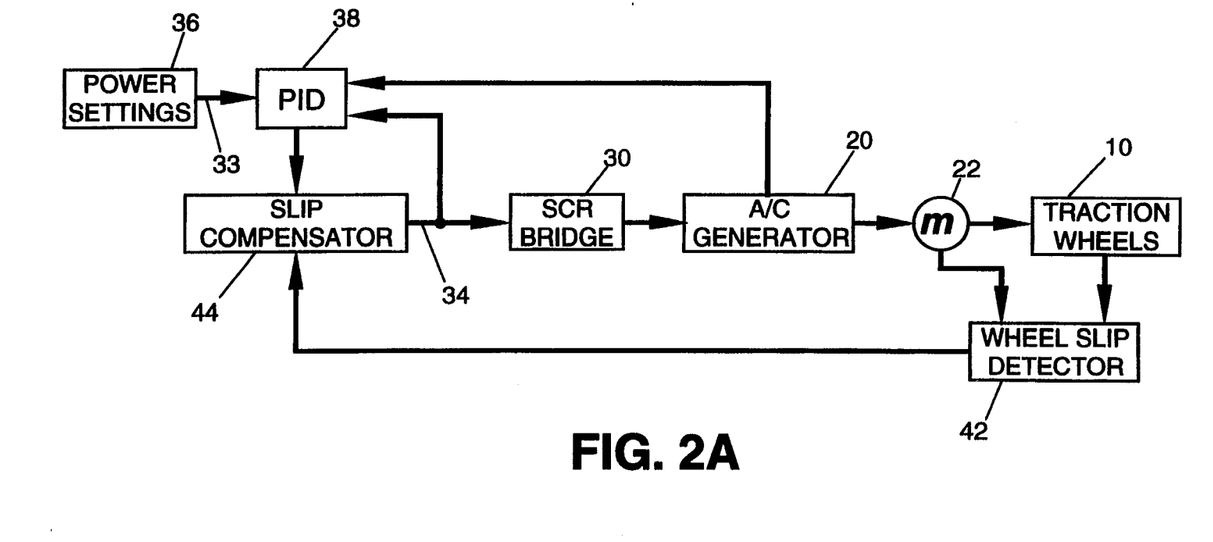
FIG. 2A is a block diagram illustrating a wheel slip controller, exemplifying certain elements of the present invention.

Referring now to FIG. 2A, a block diagram of the wheel slip control system is shown. The traction motors 22 are controlled by a plurality of PID controllers, wherein a single PID controller is operative at any given instant. One PID controller operates so as to maintain a constant current to the motors 22 when the locomotive is travelling at relatively low ground speeds. A second PID serves to maintain a constant power to the motors 22 when travelling at moderate ground speeds. A third PID controller maintains a constant voltage to the motors when travelling at a relatively high ground speed. Block 38 is representative of all of the PID controllers, since for purposes of understanding the present invention it is irrelevant which particular PID controller is operative when excessive slip is detected.

The operation of each PID 38 is dependent upon three input signals: a reference signal 33 determined by the power settings 36 and power schedule 23 (See FIG. 2B), the main generator 20 output (either voltage, current, or power), and a feedback of the SCR bridge 30 control signal 34. In short, the PID is designed so that its output forces tracking of the input reference signal 33. The PID response time, or speed at which the generator output follows changes in the reference signal 33, is determined by the main generator 20 response as well as proportional, integral, and derivative terms within the PID controller.

Figure 2B:
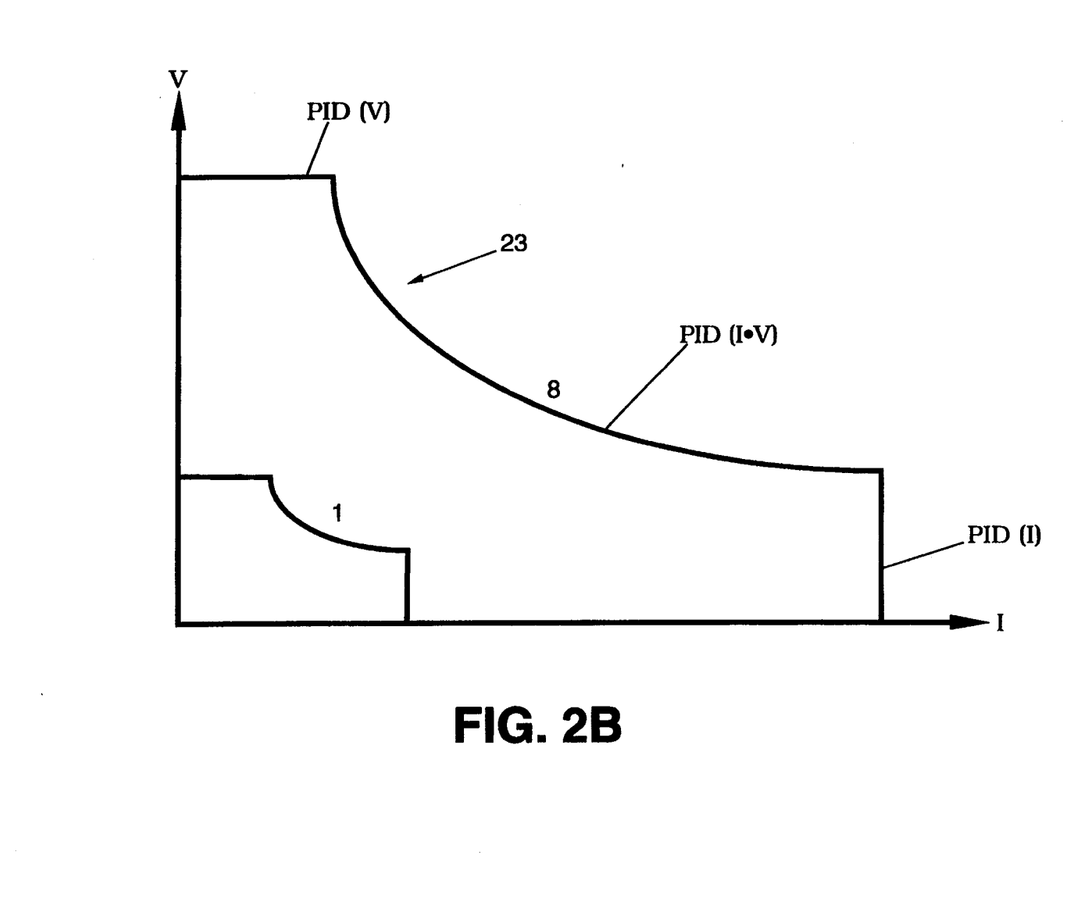
FIG. 2B is a power schedule showing desired operational points of the main generator for different throttle notch positions.

Reference is now made to FIG. 2B to more specifically describe the feedback term provided by the main generator 20. The main generator 20 output is parsed into voltage and current component values. Each of these values is fed back to the respective voltage or current PID, and a scheduled value, as illustrated in the figure, is fed back to the power PID. A unique power schedule 23 is defined in accordance with each individual throttle position, and the goal of the PIDs 38 is to control the main generator 20 so as to operate in a stable manner along the power schedule 23, at each notch position.

Again referring to FIG. 2A, in a preferred embodiment of the present invention the reference signal 33 is adapted to controllably "ramp up" when, for example, the operator moves the throttle from a lower position to a higher throttle position. The ramp time is dependent on the characteristic of the particular engine to accept load.

The output of the PID 38 is directed to a slip compensator 44, which feeds the output from the PID 38 directly through to the SCR bridge 30, during times of normal or nonslip operation. During times of excessive wheel slip, however, the output of the PID 38 is interrupted and control of SCR bridge 30 is maintained by the slip compensator 44.

A wheel slip detector 42 continuously monitors motor 22 operation to detect excessive wheel slip conditions. The inputs to the wheel slip detector 42 are derived from the various operational sensors previously discussed. The output of the wheel slip detector 42 signals the slip compensator 44 of detection of an excessive wheel slip condition, which will first store the output value of the presently operative PID controller 38. Then, the slip compensator 44 will begin compensating the control signal 34 to the SCR bridge 30 until the excessive wheel slip condition has been corrected.

In accordance with the invention, the slip compensator 44 does not act on or through the operative PID 38 or normal power supply controller, but instead is configured in parallel with the PID 38 so as to assume, when activated, direct control of the drive motors 22. Even where slip is detected rapidly, if the slip compensator signal is used as an input to the normal power supply controller, performance is limited by the response characteristics of that controller. In accordance with the invention, the normal controller is suspended, and the parallel located slip compensator 44, responsive to slip signals (and to signals from the operative PID 38) assumes direct control of the traction motors. We have found that operating in this fashion provides substantially enhanced response time in reducing slip to acceptable levels.

In a preferred embodiment of the invention, the operative PID 38 controller is suspended by limiting any upward progression of the reference signal 33 input. In this way, the operative PID 38 is carefully controlled to resume operation at about the point in the control cycle that existed at the time of detecting excessive wheel slip. We have also found that in many cases it is unnecessary to limit the PID reference signal 33 input, and we simply allow the input to continue to ramp in accordance with its normal operation. The PID control loop, of course, has normal feedback signals returning from the motor, and thus its output signal will follow the response of the motor, even though the motor 22 response is being controlled by the slip compensator 44 at that time. When the slip compensator 44 detects that the system has been returned to an acceptable slip level, the slip compensator 44 turns control back over to the operative PID 38, and control of the motors 22 resumes with the conditions in existence at that time.

We have found that it is a significant advantage to position the slip compensator 44 effectively in parallel with the PIDs 38, and have characterized that structure herein as "direct control" of the traction motor power supply. This is in contrast with indirect control wherein the slip compensator 44 provides an input signal to a running controller, such as the PID 38, and the running controller controls the power supply, albeit in response to slip control signals.

Indeed, it is a significant aspect of the preferred embodiment of the present invention that the output signal from the controlling device (whether it is the PID 38 or slip compensator 44) is in direct control of the SCR bridge 30. Although the signal may be physically passed through an intermediate device such as a buffer or amplifier, it nevertheless directly controls the SCR bridge 30 in the sense that the output signal from the controlling device is passed to the SCR bridge 30 with substantially no delay or distortion. A delayed or distorted signal, as would result if the signal was passed through an integrator filter, for example, would adversely impact the system response time. Accordingly, by providing such direct signal control of the SCR bridge 30, the system response time and, therefore, the locomotive performance is enhanced—particularly during acceleration under load, when wheel slips are frequently encountered.

The wheel slip detector 42 continues to monitor motor and wheel operation before, during, and after the slip condition. Once the slip compensator 44 has returned the traction wheel 14 operation to an appropriate level (i.e., nonexcessive slip), the output of the wheel slip detector 42 will then change states to signal the slip compensator 44 that the slip condition has been corrected. The slip compensator 44 will then return control of the motor 22 back to an operative PID controller 38 so that normal motor control operation is resumed.

Figure 3A:
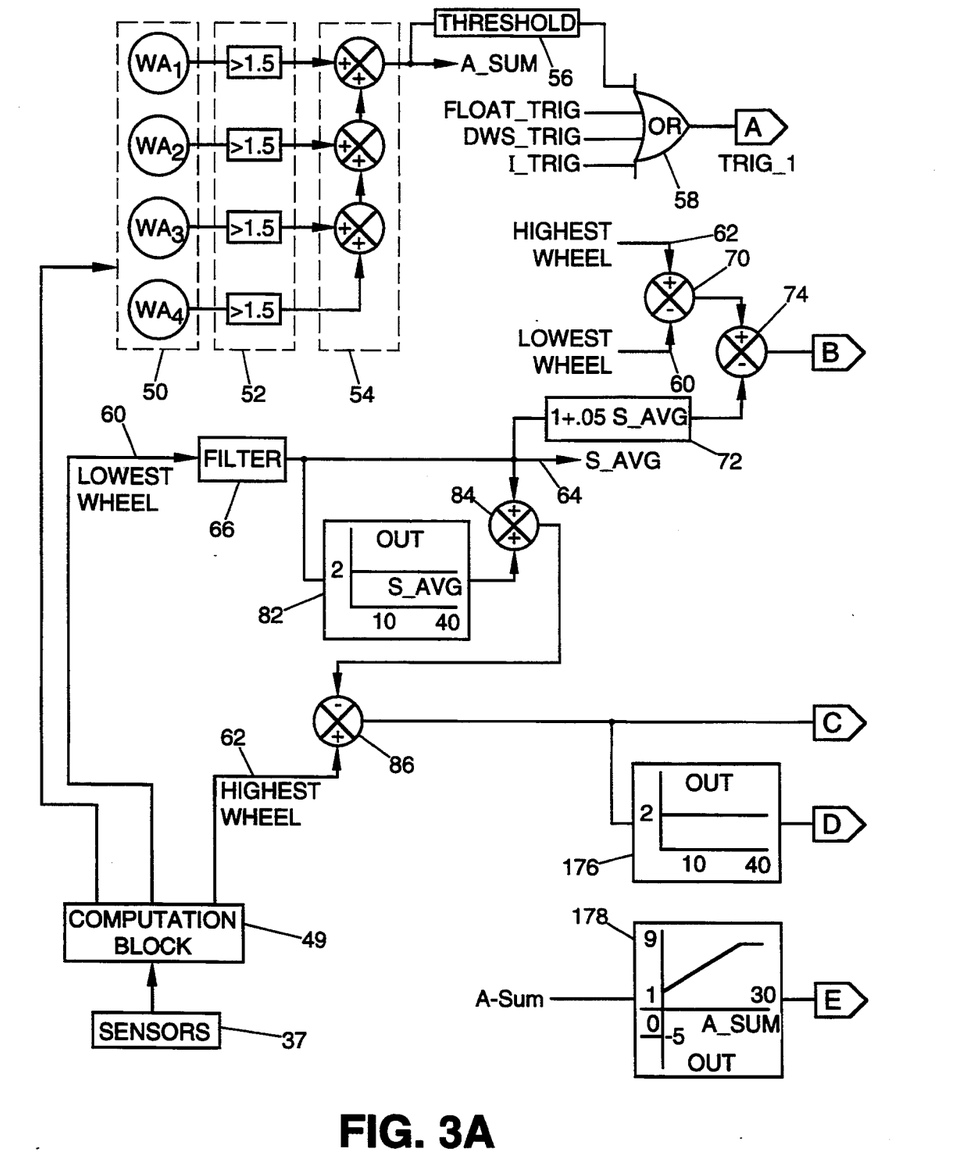
FIGS. 3A-3C comprise a flow chart depicting a preferred manner of effectuating wheel slip compensation in a locomotive propulsion system.
Figure 3B:
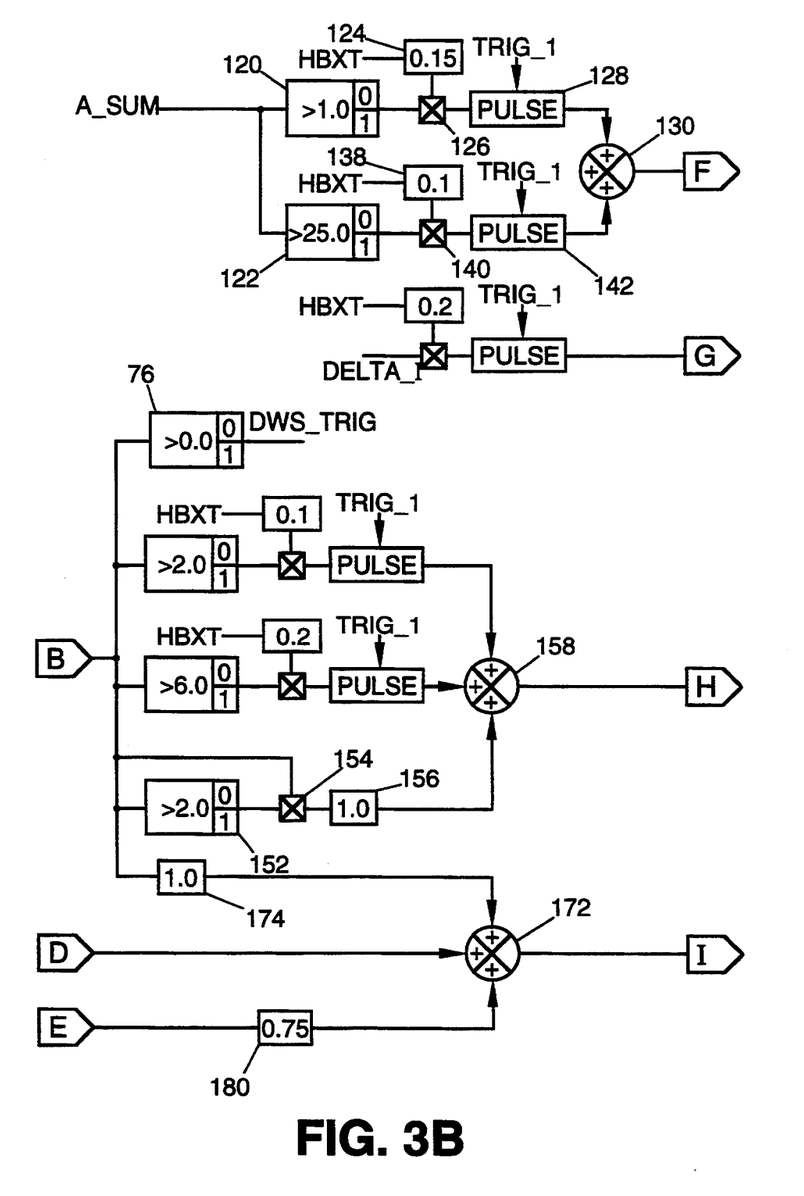
Figure 3C:
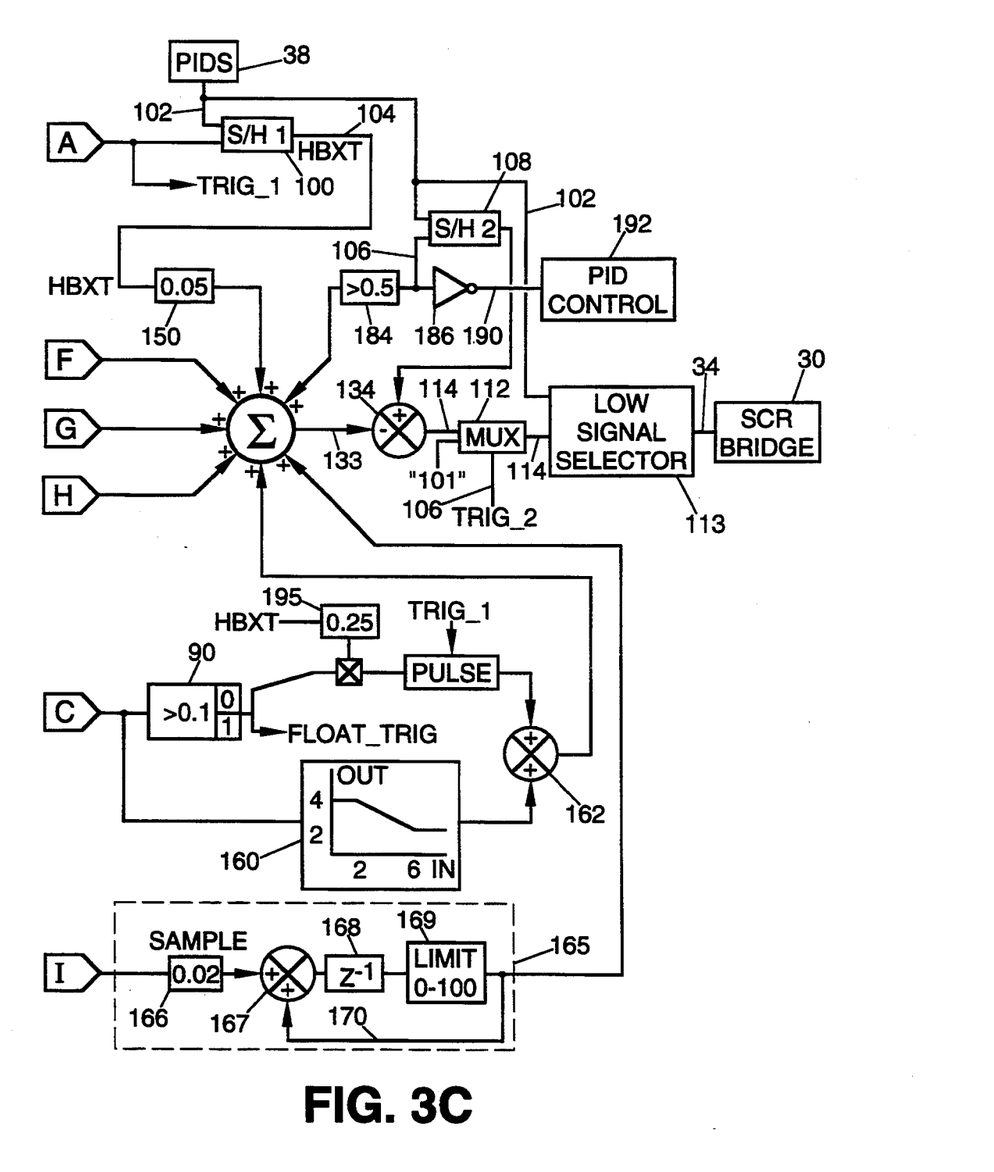

Referring now to FIGS. 3A-3C collectively, a more detailed diagram is shown illustrating the structural and functional aspects of a system constructed in accordance with the present invention. The controller is preferably implemented to include an appropriately programmed microprocessor with the necessary interfaces. The process executed by the controller under the direction of the computer 35, and the structural and functional interrelationships between the elements of the controller, will be best understood by a consideration of FIGS. 3A-3C. The form of these figures was chosen to convey a greater and more readable understanding of the system control than traditional software flowcharts.

All the numerical values shown in various blocks of FIGS. 3A-3C pertain to a preferred embodiment of a four axle locomotive wheel slip controller. Substantially the same diagram, however, will apply to six axle locomotive wheel slip controllers as well as four and six axle locomotive controllers for wheel slide. While the adaptations necessary to conform FIGS. 3A-3C for operation in other modes (i.e., six axle wheel slip and four and six axle wheel slide) will be described below, it should be appreciated that the necessary adaptations could be derived by persons skilled in the art by practicing the present invention as disclosed herein.

In keeping with the description of the preferred embodiment, excessive wheel slip is detected and signaled by the occurrence of any of four separate events. These include excessive traction wheel acceleration, excessive differential between the various traction wheel speeds, excessive differential between the various traction motor currents, and excessive differential between the fastest traction wheel speed and the estimated speed of the locomotive.

Beginning with the various traction wheel acceleration rates, sensors 37 are used to detect the rotational speed of each the wheel set 10 (also see FIG. 1). It should be appreciated that any of a number of conventional type sensors could be used to detect wheel speed, including Hall-effect sensors, infra-red emitter-detector pairs, etc.. The information from the sensors 37 is fed into a computation block 49 which computes the acceleration rate for each of the traction wheel sets. The individual acceleration rates are denoted as WA1 through WA4, collectively designated as reference numeral 50 in FIG. 3A. While various factors such as the ground speed of the locomotive, the load on the locomotive, and the number of traction wheel pairs can be used to precisely determine a maximum permissible acceleration rate for any given traction wheel, a preferred embodiment of the present invention uses an estimated value for simplicity. In particular, a preferred embodiment of the present invention will indicate excessive wheel slip if the sum of the accelerations of all traction wheel sets is greater than a defined value.

As shown in FIG. 3A, the wheel acceleration for each traction wheel set is fed into a threshold block (threshold blocks collectively designated as reference numeral 52), wherein the threshold blocks function so that the traction wheel acceleration value is passed through the threshold block if it is greater than the threshold value. Otherwise, a value of zero is output from the respective threshold blocks. Although a threshold value of 1.5 miles per hour is shown in FIG. 3A, in practice the value is varied with ground speed and traction motor current. Specifically, the threshold value is reduced at low ground speeds and high current levels, and increased at high ground speeds and low current levels.

The outputs of these threshold blocks 52 are then collectively summed at 54 to produce a value designated as A_SUM. This value is then passed through an additional threshold block 56 before being input into an OR gate 58. Ignoring for a moment the threshold 56, assume that the A_SUM value is directly input to the OR gate 58. The way the software interprets this is that if the value entering the OR gate 58 is anything other than a zero, then the output of the OR gate (designated as Trig_1, FIGS. 3B and 3C) will become active, indicating an excessive wheel slip condition.

Now returning to consider the operation of the threshold block 56, its operation is similar to that of the threshold blocks 52, previously discussed. That is, if the input A_SUM to the threshold block 56 is greater than a predetermined amount, then that value will pass through the output to the OR gate 58. Otherwise, the output will remain zero. The threshold value of this threshold block 56, however, is actively changed during locomotive operation to improve performance of the wheel slip control system. Typically, this value is set at zero so that if any of the individual threshold blocks of 52 have been satisfied (i.e., any traction wheel accelerating above 1.5 miles per hour per second), then the OR gate 58 will be activated. However, it is known that when the locomotive is traveling at low load or low motor current, the wheel slip detection based on traction wheel acceleration is excessively triggered. Accordingly, at low motor current operation, the value of this threshold block 56 is raised to prevent the traction wheel acceleration indicia from excessively activating the wheel slip control operation of the present invention.

A second event that will signal the OR gate 58 to indicate excessive wheel slip and trigger the slip compensation routine is denoted as I_TRIG. While the generation of this value is not shown in the figures, it is sufficient to note that sensors 37 monitoring the traction motor 22 current are used to feed this information back to the computer 35 which then will set a variable threshold (similar to the wheel acceleration threshold) based upon the present speed of the locomotive. Since the traction motor 22 would demand more current when operating a low speeds, the threshold value is accordingly higher at higher motor currents.

As should be appreciated, a primary reason for monitoring motor current differential is to detect slippage of the pinion gear at the motor shaft. When this occurs, the motor speed will increase, even though the traction wheels will continue to rotate at track speed. As the motor speed increases, the current will decrease since there is no load on the motor.

The remaining two inputs to the OR gate 58 are designated as FLOAT_TRIG and DWS_TRIG. The generation of these signal values are shown in the figures and will be understood from the review of the following discussion.

As previously discussed, various wheel sensors 37 are used to sense the rotational speed of the traction wheels. The output of these sensors are then fed into a computation block 49 which, in addition to determining the respective accelerations, also determines the highest and lowest traction wheel speeds. The value of the lowest wheel speed is represented on signal line 60, whereas the value of the highest wheel speed is represented on signal line 62.

In order to avoid the high cost associated with a radar or other doppler device to detect actual ground speed, the present invention generates a signal, S_AVG on line 64 that is an estimate of the locomotive ground speed. This signal is generated by inputting the lowest wheel speed 60 into a lag filter 66 having a long time constant. Since the lowest speed would be that traction wheel with the least amount of slip (frequently zero slip), further filtering this signal with such a long time constant provides an effective manner of filtering erroneous values due to slip. This ground speed estimation filter 66 has a rate limit or acceleration limit for increases in estimated ground speed. There is, however, no limit for decreases in estimated ground speed.

Accordingly, the output of the filter 66 provides an excellent estimate of the average ground speed at a substantial cost savings over systems utilizing radar or other sophisticated devices. Alternatively, consistent with the teachings of the present invention, the ground speed of the locomotive could also be determined by placing an additional wheel speed sensor on a nontraction wheel set.

In order to generate the DWS_TRIG signal, the lowest wheel speed 60 is subtracted from the highest wheel speed 62 through the adder element 70. As a way of dynamically thresholding this differential wheel speed value, functional block 72 is provided. The output of this block 72 is computed by adding the constant value 1 with the product of 0.05 multiplied by the value of the estimated ground speed S_AVG. The output of this block 72 is then subtracted from the output of adder 70 by adder 74. This value is then passed through threshold block 76 to generate the signal DWS_TRIG. As shown in the figure, the value of this threshold block is zero. Accordingly, any positive value output from the adder 74 will indicate excessive wheel slip, resulting from excessive wheel speed differential.

To illustrate the operation of this portion of the wheel slip controller, consider the following numerical example. Assuming that the differential wheel speed between the highest and lowest traction wheels is 3.5 miles per hour, this value is output from adder 70. If the estimated ground speed S_AVG of the locomotive is 10 miles per hour, the output of block 72 will be 1.5 ($1+0.05\times10$). Therefore, the output of adder 74 will be 2 ($3.5-1.5$), which is sufficient to generate the DWS_TRIG signal indicating excessive wheel slip. Assuming now, however, that the locomotive is traveling at 50 miles per hour and all other factors are the same, the output of block 72 would be 3.5. Accordingly, the output of adder 74 would be zero and no excessive wheel slip would be indicated.

In keeping with the description of the preferred embodiment, the final index of excessive wheel slip is what is denoted as FLOAT_TRIG. This nomenclature was chosen to designate a differential between the highest wheel speed 62 and a predetermined proportionate value of the estimated ground speed. Generally, the FLOAT_TRIG signal is generated by subtracting a thresholded value of the estimated ground speed from the highest wheel speed and, if that value is a positive number, indicating excessive wheel slip. More specifically and as shown in the figures, the output of the lag filter 66 (i.e., the estimated ground speed, S_AVG) is input into a schedule block 82. In a preferred embodiment, this schedule block 82 has a constant output value of two. It is shown in graphical form, however, to suggest that this output value can be easily scheduled or varied against the value of the estimated ground speed. That is, in certain applications it may be preferred to provide an output value that is variable, depending upon the value of S_AVG.

Continuing with the description, the output of the schedule block 82 (a constant value) is combined with S_AVG by adder 84. It can be readily determined that the output of adder 84 in this preferred embodiment is two units (e.g., miles per hour) more than the value of S_AVG. This value is then subtracted from the highest wheel speed by adder 86. The output of adder 86 is then input through a threshold block 90 (FIG. 3C), having a threshold value of 0.1. If this threshold block 90 is satisfied (e.g., has an input value greater than 0.1) then the signal FLOAT_TRIG is activated, indicating excessive wheel slip.

It can be appreciated that the schedule block 82 provides a convenient way to effect the FLOAT_TRIG wheel slip threshold. That is, in order for the FLOAT_TRIG signal to indicate excessive wheel slip, the highest wheel speed must exceed the estimated ground speed by an amount greater than the output of the schedule block 82. Accordingly, the present invention can be readily adapted to dynamically effect the FLOAT_TRIG threshold signal based upon the estimated ground speed S_AVG.

The foregoing discussion has described the wheel slip detector of a preferred embodiment of the present invention. Continuing with the detailed description, the slip compensator 44 and its control loops will now be described. When the OR gate 58 (FIG. 3A) is activated, the output, designated as TRIG_1 triggers a memory device or sample and hold 100 to save current output value of the operative PID 38. As shown in the figure, there are two inputs to the sample and hold 100; the first input or signal line 102, is the output signal from the operative PID controller 38. The second, or gating input (TRIG_1), is used to initiate or invoke operation of the sample and hold 100. Upon gating the sample and hold 100, the output, designated as HBXT on signal line 104, is held at the present value of the input 102.

As previously described, during normal locomotive operation, control signal 34 to the SCR bridge 30 (FIG. 3C) is controlled by the operative PID controller 38. This control is accomplished by routing the output signal 102 of the PID 38 through a multiplexer or MUX 112 and a low signal selector 113 (which outputs the lesser of its two input values). Upon detection of excessive wheel slip as indicated by actuation of the OR gate 58, TRIG_2, or signal line 106, is immediately activated, thereby invoking the operation of a second sample and hold 108 which also samples the output value 102 of the operative PID controller 38. TRIG_2 is further used to control the MUX 112 to select the output signal 114 generated by adder 134 as the signal passed to the low signal selector 113, and on as the control signal 34 for the SCR bridge 30. When Trig_2 is not activated, the MUX 112 passes a bus value of 101 on to the low signal selector 113. This ensures that the control signal 34 is dictated by the output of the PIDs 38, since the output of the PIDs 38 will always be less than a bus value of 100. In this way, the MUX 112 and the low signal selector 113 cooperate to shift control of the SCR Bridge 30 between the PIDS 38 and the slip compensator 44 (See FIG. 2A).

As is illustrated in the figures, a preferred embodiment of the present invention alternately supplies the control signal 34 either from the PID 38 output signal or the slip compensator 44 output signal as produced by adder 134. Although these signals are illustrated as passing through a MUX 112, it should be appreciated that the important aspect is that the signals alternately supply the control signal 34 with substantially no delay or distortion, in contrast to a system wherein these signals may be passed through a further filtering stage such as an integrator. This ensures a faster response of the generator 20 output based upon changes in either the PID 38 or the slip compensator 44 output control signal.

In keeping with the description of the preferred embodiment, the slip compensator 44 (see FIG. 2) generally operates as follows: various values of wheel slip indicia (e.g., differential wheel speeds, wheel acceleration, and drive motor current) are scaled and processed so as to dynamically control the SCR bridge 30 and, accordingly, traction motors 22. More specifically, a first level of compensation is provided by various PULSE compensators. These compensators provide a pulsed or temporary level of compensation based upon the speed of the locomotive. In a preferred embodiment of the present invention, each PULSE compensator is configured to provide a compensation term for a period of 0.4 seconds at locomotive speeds below 4 miles per hour, for 0.2 seconds at speeds above 8 miles per hour, and a linear interpolation for intermediate values. Furthermore, additional PULSE compensators may be added, or the time constants of the PULSE compensators may be changed, to compensate for varying degrees of wheel slip.

Referring again to the figures, the signal A_SUM is input into two threshold blocks 120 and 122 (FIG. 3B). The output of these threshold blocks is a logic one when the block is triggered and a logic zero otherwise. As denoted by the nomenclature within the blocks, the threshold block 120 is triggered if the input value is greater than 1 mile per hour per second, whereas the threshold block 122 is triggered only if the value is greater than 25 miles per hour per second.

HBXT (i.e., the stored value of the operative PID output) is input into a gain block 124 where it is scaled by a value of 0.15. The output of gain block 124 is fed through a multiplier 126, when the A_SUM value is sufficient to trigger the threshold 120, and passed through the pulse block 128, which is activated by TRIG_1. The output of the pulse block 128 is then summed at 132 with other values to generate a compensation term at 133. It should be noted that the compensation term 133 is subtracted from the output of sample and hold 108. Accordingly, the slip compensation that ultimately affects the control line 34 to the SCR bridge 30, is dependent upon the value of the PID controller 38 at the point of operation when excessive slip was detected.

In continuing the description of the compounded pulse compensation, HBXT is also passed through gain block 138, where it is scaled by a value of 0.1. The output of this gain element 138 is then passed through multiplier 140 if the A_SUM value is greater than 25 miles per hour. This value is then passed on through pulse block 142 and into adder 130. It can be readily seen that this compensation component will be zero if the value of A_SUM is less than 25 miles per hour per second.

To provide a simple numerical example of the operation of this portion of the present invention and how it dynamically generates compensation values based upon wheel slip indicia, consider the following. The bus value (i.e., digital value) of the output of the normally operative PID controller 38 can range from a minimum of zero to a maximum of 100, and is typically within a range of 20 to 80. This bus value correlates to the amount of time that the control line 34 is controlled so as to gate the SCR bridge 30 and, therefore, controls the duty cycle for the SCR bridge 30. Specifically, a bus value of zero gates the SCR bridge 30 at the 180 degree phase angle of the AC input as generated by the auxiliary generator 21, while a bus value of 100 gates the SCR bridge 30 at the zero degree phase angle (assuming that the zero degree phase angle is the positive going zero crossing, while the 180 degree phase angle is the negative going zero crossing).

For purposes of this example, assume that the output or bus value of the operative PID controller is 50 when excessive wheel slip is detected and, further, that excessive slip is triggered by an A_SUM value of 5 miles per hour per second; the output value of the sample and hold 108 feeding into adder 134 would be 50, the output value of the interrupted PID. Assume also that all other compensation values are zero, except for the values generated by the pulse blocks 128 and 142 as previously described. Since the A_SUM value is greater than one but less than 25, the output of pulse block 142 is zero, and the only compensation component that will be produced is that generated by pulse block 128. Since the value of HBXT is 50, the output of gain block 124 would be the product of HBXT multiplied by 0.15 (50×0.15) or 7.5. This value is then passed through multiplier 126 and pulse block 128 for the appropriate period of time, (0.4 seconds if the locomotive speed is less than 4 mph and 0.2 seconds if the speed is greater than 8 mph) where it passes through adder 132, ultimately to combine at adder 134 with the sampled PID value of 50, to produce an output on signal line 114 of 42.5 (50−7.5). Note, this value (42.5) would gate the SCR bridge 30 at approximately the 103.5 degree phase angle.

Other gain, multiplier, and pulse compensator blocks are shown in the figure and are used to generate additional compensation terms based upon the output of adder 74. An additional compensation term is generated in response to excessive differential motor current (DELTA_I). In view of the above discussion, however, a detailed discussion of each individual computational section is unnecessary, as the operation of the various computational components is equivalent to the operation of those just described, with the only difference being the particular threshold and gain values. Moreover, the description provided above, coupled with the information in the figures is sufficient to enable one of ordinary skill to practice the concepts of the present invention.

As previously mentioned, the pulse compensators serve to provide a first level or burst of compensation that lasts for less than one second. While this corrective action will often correct excessive wheel slip, frequently the amount of wheel slip is such that this temporary compensation component is insufficient to completely correct it. Accordingly, further compensation is required. To provide a second level of slip compensation, three proportional compensation paths are provided. The proportional compensation and integral compensation (discussed below) are initiated at the same time as the pulse compensation, but each of these components continue throughout the duration of the excessive wheel slip condition.

The first of these proportional compensation components is generated by scaling the value of HBXT by 0.05. This is done in gain block 150, the output of which is directed to adder 132. The second proportional compensation component is generated based upon the differential wheel speed between the highest and lowest wheel speeds. Specifically, the output of adder 74 (previously discussed) is passed through a threshold block 152, whereby if the output of adder 74 is greater than 2 miles per hour, the new value is passed through multiplier 154 and gain block 156, adder 158, and ultimately passed into adder 132.

The third and final proportional compensation component is generated by passing the output of adder 86 (FIG. 3A) through schedule block 160 (FIG. 3C), through adder 162, and into adder 132. It can be seen that schedule block 160 provides a variable output depending upon the input value. More particularly, when the input value is less than 2, the output value is 4. If, however, the input is greater than 6, the output value is 2. Where the input value is between 2 and 6, the output value decreases linearly with the input between values of 4 and 2, as graphically shown in the figure.

A third and final level of slip compensation is provided by three separate integrator paths, for situations in which excessive wheel slip is not quickly eliminated by the combination of the pulse compensator values and the proportionate compensation values. Specifically, this integration is achieved through the digital integrator 165 (shown in dashed lines). The signal output from adder 172 is sampled by sampler 166 every two-hundredths of a second (i.e., 50 times per second). This sampled value is then passed through a feedback loop comprising an adder 167, a unit delay block 168, a limiter 169 and feedback path 170. It should be understood that this simple feedback configuration implements a digital or discrete time integrator.

The input to the integrator is derived from three separate input lines that are combined at adder 172. The first line, passing through gain block 174, is the value output by adder 74, which is related to the differential between the highest and lowest wheel speeds. The second line passes through schedule block 176, which has a constant output value of 2, and is obtained from the output of limiter 88. Like schedule block 82, schedule block 176 is graphically displayed to suggest that it may be desired to provide a variable output in another embodiment of the present invention.

The final integration term is derived from the A_SUM value. Specifically, the A_SUM value is passed through a scheduled block 178, wherein an A_SUM value of zero or less generates an output of −5. Positive values of A_SUM generate a positive output by the following schedule: where A_SUM is slightly greater than zero, the output is 1. At large values of A_SUM, for example, 30 miles per hour per second or greater, the output is 9. Furthermore, the output linearly increases between 1 and 9 as the value of A_SUM increases from zero to 30 miles per hour per second. The output of this block is then passed through gain block 180 where it is scaled by 0.75 and then input into adder 172. The function of schedule block 178 is to provide a large compensation component for extremely high wheel slip values. Further, it performs the function of turning the compensator off once wheel slip has been corrected.

To more particularly describe this shut down operation, consider signal TRIG_2 as controlling the MUX 112. As long as TRIG_2 is active, the signal output to the SCR bridge 30 is provided by the slip compensator 44, and input to the MUX 112 on line 114. Therefore, in order to return control to the operative PID controller 38, the signal TRIG_2 must be deactivated. This deactivation occurs when the output of adder 133 drops below 0.5 as is evident looking at threshold 184. If the value of HBXT, as sampled from the operative PID 38, is 50 (as used in the previous examples) then the compensation value generated by the proportionate term passing through gain block 150 alone would be 2.5 (50×0.05). It is, therefore, apparent that in order to deactivate TRIG_2 and return control of the SCR bridge 30 to the operative PID controller 38, a negative term must be added into the compensation. This is the purpose of providing the negative output from schedule block 178 when the acceleration summation has dropped to zero. Furthermore, since this negative term is passed through an integrator, the longer the period of time that transpires, the greater the negative component will be that is added at adder 133. Accordingly, the schedule block 178 performs the dual function of ramping up the integrator value to provide heavy compensation in situations of extremely high slip values while also ramping the integrator down to shut off operation of the slip compensator 44 once slip has been corrected (e.g., A_SUM equal to zero).

One final point to note in the figure is that TRIG_2 is passed through an inverter 186 (FIG. 3C) generating an output 190 which feeds into a block designated as PID control 192. In one embodiment of the present invention, it is desired to limit the upward progression of the reference signal 33 to the PID controller 38. In this embodiment, the purpose of block 192 is to limit the reference ramp signal 33 to the PID controller 38, thereby affecting the operation of the operative PID controller 38 during the time that the slip compensator is active. In a preferred embodiment, the PID control 192 may be implemented as simply as a software condition flag that is either set or reset. The microprocessor executing the software control freezes the value of the reference signal 33 if the condition flag is set. Once the excessive wheel slip condition has been corrected and the TRIG_2 signal is deactivated, the condition flag of the PID control 192 is reset. The microprocessor then releases the limit on the reference ramp signal 33, allowing it to continue to ramp up from the point at which it was frozen or held. In this way, the interrupted PID controller 38 will resume operation at substantially the same point of operation at which it was operating when interrupted.

Consistent with the concepts and teachings of the present invention, it should be appreciated that other, equally effective means could be implemented to effectuate the disclosed means for interrupting and transferring control to and from the operative PID. Indeed, since the preferred embodiment of the present invention is carried out largely by software routines executed under computer control, there are a wide variety of programming techniques that may be utilized to achieve the functions described above. Furthermore, numerous hardware (rather than software) solutions also may be exercised to accomplish the teachings of the present invention.

In summary, a preferred embodiment of the present invention monitors a plurality of wheel slip conditions to quickly identify excessive wheel slip. Upon detecting excessive wheel slip, the output of the operative PID 38 is stored in a memory, and a plurality of control loops of the slip compensator instantaneously begin generating compensation terms, including pulsed terms, proportional terms, and integral terms, which are utilized to control the output of the main generator 20 as applied to the field excitation coil 32. Throughout this period, wheel slip is continuously monitored. Once wheel slip has been reduced to an acceptable level, control of the main generator 20 is returned to the operative PID 38.

In a locomotive having four traction wheel axles, wheel slide can be corrected by the present invention as described in the foregoing description and drawings, with the following changes: the gain value of gain block 150 is changed from 0.05 to 0.2; the gain values in all other gain blocks having the signal HBXT as a direct input are changed to zero; and the output of schedule block 176 is changed to a constant value of zero.

In a locomotive having six traction wheel axles, wheel slip can be corrected by the present invention as described in the foregoing description and drawings, with the following changes: the gain value of gain block 124 is changed from 0.15 to 0.075; the gain value of gain block 138 is changed from 0.1 to 0.05; the gain value of gain block 156 is changed from 1.0 to 0.1; the gain value of gain block 195 is changed from 0.25 to 0.1; the gain value of gain block 174 is changed from 1.0 to 0.1; the threshold value of block 90 is changed from 0.1 to 0.5; the value of schedule blocks 82 is changed from constant values of two to a constant value of four; the value of schedule block 176 is changed from a constant value of two to a constant value of one; and the output values of schedule block 160 are changed from four and two to two and one, respectively. That is, the output value for schedule block 160 is changed to half the output value for four axle wheel slip, for each and every input value.

In a locomotive having six traction wheel axles, wheel slide can be corrected by the present invention as described in the foregoing description and drawings, with the following changes: the gain value of gain block 150 is changed from 0.05 to 0.3; the gain values in all other gain blocks having the signal HBXT as a direct input are changed to zero; the output of schedule block 176 is changed to a constant value of zero; the output of schedule block 82 is changed from a constant value of two to a constant value of four; the output values of schedule block 160 are changed from four and two to two and one, respectively; and the threshold value of block 90 is changed from 0.1 to 0.5.

To adapt the present invention as hereinabove described for locomotives having six traction wheel sets, the following changes must be made for both wheel slip and wheel slide embodiments. First, additional sensors must be added for detecting the rotational speeds of the additional traction wheel sets, as well as additional sensors for detecting the motor currents for the added motors. Accordingly, elements WA5 and WA6 must be added to the block denoted as reference numeral 50. Similarly, two additional threshold blocks and two additional adders must be added to blocks 52 and 54.

A final item to note, in regards to acceleration thresholding for the four and six axle wheel slide embodiments, is that it should be understood that the acceleration rate for wheel slide is a negative value. Accordingly, the computer 35 must invert the magnitude of the acceleration rate before submitting that value to the threshold blocks 52 and adders 54. Thus, the value of the acceleration rate as denoted by WA1 through WA6 is always a positive value.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A wheel slip controller for a locomotive of the type having a plurality of traction motors, each disposed to rotate a pair of traction wheels for propelling the locomotive, the wheel slip controller comprising, in combination:
 a variable power supply for controllably supplying power to the motors;
 at least one Proportional-Integral-Derivative (PID) controller having an output signal for controlling the variable power supply during non-excessive wheel slip locomotive operation;
 a reference signal applied to an input of the PID controller, wherein the PID controller operates to controllably change the output of the variable power supply to track the reference signal;
 a wheel slip detector for detecting excessive wheel slip; and
 a slip compensator having:
  at least one slip correction control loop responsive to the wheel slip detector for rapidly reducing wheel slip;
  an output signal for controlling the variable power supply during times of excessive wheel slip;
  means for interrupting the PID controller and transferring control of the variable power supply from the PID controller output signal to the slip compensator output signal upon detection of excessive wheel slip by the wheel slip detector; and
  means for returning control of the variable power supply back to the PID controller output signal upon elimination of excessive wheel slip.

2. The wheel slip controller according to claim 1, further including a memory in the slip compensator for storing the value of the PID controller output signal upon detection of excessive wheel slip by the wheel slip detector.

3. The wheel slip controller according to claim 2, wherein the value stored in the memory serves as a reference input to the control loop of the slip compensator.

4. The wheel slip controller according to claim 3, wherein the slip compensator output signal is in direct control of the variable power supply.

5. The wheel slip controller according to claim 4, wherein the slip compensator output signal is derived from a combination of the value stored in the memory and a slip correction value generated by the control loop of the slip compensator.

6. The wheel slip controller according to claim 5, wherein the slip correction value is dependent upon the magnitude of wheel slip.

7. The wheel slip controller according to claim 6, wherein the slip compensator remains in control of the variable power supply until the magnitude of the slip correction value is approximately zero.

8. The wheel slip controller according to claim 4, wherein sensors and a computer are configured to determine a differential between a fastest and slowest traction wheel speeds, the control loop being responsive to the differential between the maximum and minimum traction wheel speeds to generate the output signal of the slip compensator.

9. The wheel slip controller according to claim 4, wherein sensors and a computer are configured to determine a rate of acceleration of the traction wheels, the control loop being responsive to the rate of acceleration of the traction wheels to generate the output signal of the slip compensator.

10. The wheel slip controller according to claim 4, wherein sensors and a computer are configured to determine a differential between a speed of a fastest traction wheel and an estimated speed of the locomotive, the control loop being responsive to the differential between the speed of the fastest traction wheel and the estimated speed of the locomotive to generate the output signal of the slip compensator.

11. The wheel slip controller according to claim 4, wherein sensors and a computer are configured to determine a differential between the traction motors currents, the control loop being responsive to the differential between the traction motor currents to generate the output signal of the slip compensator.

12. The wheel slip controller according to claim 4, wherein sensors and a computer are configured to determine a differential between a maximum and minimum traction wheel speeds, a differential between a speed of a fastest traction wheel and an estimated speed of the locomotive, a rate of acceleration of the traction wheels, and a differential between the traction motors currents, the control loop being responsive to a combination of the differential between the maximum and minimum traction wheel speeds, the differential between the speed of the fastest traction wheel and the estimated speed of the locomotive, the rate of acceleration of the traction wheels, and the differential between the traction motors currents, to generate the output signal of the slip compensator.

13. The wheel slip controller according to claim 1, wherein the slip compensator includes at least one proportional compensation component.

14. The wheel slip controller according to claim 13, wherein the slip compensator includes at least one integral compensation component.

15. The wheel slip controller according to claim 1, wherein the wheel slip detector is adapted to monitor a combination of traction wheel acceleration, the differential between the maximum and minimum traction wheel rotational speeds, the differential between the maximum and minimum traction wheel drive currents, and the differential between the rotational speed of the fastest traction wheel and the estimated ground speed of the locomotive.

16. The wheel slip controller according to claim 1, wherein a plurality of PID controllers are included for controlling the variable power supply.

17. The wheel slip controller according to claim 16, wherein a single PID controller is operative at a given time to control the variable power supply, and the slip compensator is adapted to interrupt the operation of the operative PID.

18. The wheel slip controller according to claim 1, wherein the slip compensator is adapted to limit the reference signal applied to the PID controller during excessive wheel slip operation, whereby the reference signal is prevented from increasing.

19. A method of controlling wheel slip in a locomotive of the type having at least one Proportional-Integral-Derivative (PID) controller for controlling a plurality of traction motors, each disposed to rotate a pair of traction wheels for propelling the locomotive, the method comprising the steps of:

providing a controllable power supply responsive to an input signal for controlling the power applied to the traction motors;

supplying the input signal to the controllable power supply from a PID controller during non-excessive wheel slip locomotive operation;

monitoring indicators of wheel slip to detect a condition of excessive wheel slip;

upon detecting a condition of excessive wheel slip performing the following steps:

transferring the input signal of the power supply from the PID controller to a slip compensator;

operating the slip compensator based on the monitored indicators to rapidly and controllably reduce wheel slip; and continuing to monitor the indicators of wheel slip to determine a reduction of wheel slip to a permissible amount, and thereafter switching the input signal of the power supply back to the PID controller.

20. The method of controlling wheel slip according to claim 19, wherein the step of monitoring indicators of wheel slip includes continuously monitoring the differential between maximum and minimum traction wheel speeds.

21. The method of controlling wheel slip according to claim 19, wherein the step of monitoring indicators of wheel slip includes continuously monitoring the differential between traction motor currents.

22. The method of controlling wheel slip according to claim 19, wherein the step of monitoring indicators of wheel slip includes continuously monitoring traction wheel acceleration.

23. The method of controlling wheel slip according to claim 19, wherein the step of operating the slip compensator includes the steps of:

generating a compensation component based upon the amount of wheel slip detected; and subtracting the compensation component from the saved value of the PID controller.

24. The method of controlling wheel slip according to claim 19, wherein the step of operating the slip compensator includes the steps of:

generating a compensation signal for varying the power applied to the power supply; and applying that signal to provide direct control of the power supply.

* * * * *